United States Patent [19]

Cameron

[11] Patent Number: 4,627,724
[45] Date of Patent: Dec. 9, 1986

[54] RADIATION SCANNING AND DETECTION SYSTEM

[75] Inventor: Scott H. Cameron, Severna Park, Md.

[73] Assignee: The United States of America as represented by the Secretary of the Army, Washington, D.C.

[21] Appl. No.: 511,811

[22] Filed: Jul. 8, 1983

[51] Int. Cl.$^4$ .................. G01B 11/26; G01C 1/00
[52] U.S. Cl. .................. 356/141; 250/342; 250/347; 356/152
[58] Field of Search ............ 356/141, 152; 250/342, 250/347, 353

[56] References Cited

U.S. PATENT DOCUMENTS

| | | | |
|---|---|---|---|
| 3,614,239 | 10/1971 | Kissell | 356/152 |
| 3,717,413 | 2/1973 | Kubo et al. | 356/152 |
| 3,827,807 | 8/1974 | Fletcher et al. | 356/141 |
| 3,992,101 | 11/1976 | Dapper et al. | 356/407 |
| 4,092,072 | 5/1978 | Ellis | 356/141 |
| 4,117,327 | 9/1978 | Lamelot et al. | 250/342 |
| 4,193,688 | 3/1980 | Watkins | 250/347 |
| 4,443,701 | 4/1984 | Bailey | 250/332 |

*Primary Examiner*—Stephen C. Buczinski
*Attorney, Agent, or Firm*—Sheldon Kanars; Jeremiah G. Murray; Edward Goldberg

[57] ABSTRACT

A source of radiation is detected by an optical scanning system including a rotating mirror and an array of V-shaped detector elements. The detectors are arranged in vertically stacked pairs in a common plane, with the time of travel of a target image between a given pair of detectors determining the azimuth and elevation coordinates of the target. Signals from the detectors are amplified, filtered and passed through a processor which provides the desired information from the time and spatial relationships of the target and detectors. Each pair of detectors covers a given sector of the elevation angle scanned by the total array.

8 Claims, 8 Drawing Figures

RADIATION SCANNING AND DETECTION SYSTEM

The Government has rights in this invention pursuant to Contract No. DAAB07-72-C-0342 awarded by the Department of the Army.

BACKGROUND OF THE INVENTION

1. Field of the Invention

The present invention relates to radiation detection devices and particularly to a system for locating a source of radiation in both azimuth and elevation with a high degree of resolution.

2. Description of the Prior Art

Present systems for detecting and locating radiation sources are somewhat complex, require a plurality of separate detectors, and have limited resolution capability for scanning in the elevation direction. An example of a known device is found in U.S. Pat. No. 3,992,101 issued Nov. 16, 1976, wherein a pair of individual spaced detectors is used to obtain location and spectral information from a point source of optical radiation.

SUMMARY OF THE INVENTION

It is therefore the primary object of the present invention to provide an improved radiation detection and target location system having a high degree of accuracy and resolution.

A further object is to provide a simplified, more efficient optical scanning and detection system having both azimuth and elevation location capabilities.

An additional object of the invention is to accomplish improved scanning resolution with a relatively small number of detectors within a compact common planar sensing area.

These objects are achieved with an optical scanning system employing a rotating mirror and a vertical planar array of cryogenically cooled indium antimonide thin film infrared detectors arranged in stacked pairs of V-shaped elements. The time of travel of a target image between a pair of detectors in the array determines the azimuth and elevation position of the target. The detected signals are amplified and passed through a threshold detection circuit, digital filter and signal processor to provide the desired information. Other objects and advantages will become apparent from the following description in conjunction with the accompanying drawings.

DESCRIPTION OF THE PREFERRED EMBODIMENT

Figure 1:
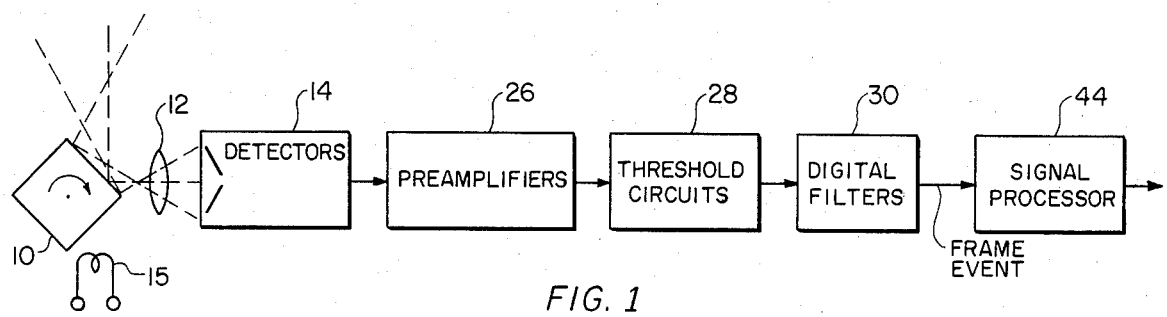
FIG. 1 is a block diagram of the system showing a rotating mirror and detectors at one end and a signal processor at the other end.

As shown in FIG. 1, the scanning and detection system includes a rotating mirror 10, a lens assembly 12 and infrared sensitive detectors 14 which are designed to inspect a total field of view extending 360° in azimuth and 40° in elevation. This coverage is obtained by mechanically scanning a vertical array of eight pairs of detectors in the azimuth direction with a four sided mirror rotated about a vertical axis at a sufficiently high speed to obtain a relatively short frame time. The useful portion of the scan, which is the time during which the entire aperture accepts rays from a single face of the mirror, corresponds to about 60° of scanner rotation or 120° of azimuth rotation in object space. Two such optical assemblies may be arranged at right angles to one another so that both are scanned by the single rotating mirror and together provide azimuth coverage of slightly over 180°. A second like arrangement of two additional optical assemblies with another rotating mirror and set of detectors are mounted on an oppositely facing surface to obtain the full 360° azimuth coverage. The mirror support is magnetic and a magnetic pickup 15 positioned adjacent a corner of the mirror generates synchronizing pulses used for correlating timing measurements.

Figure 2A:
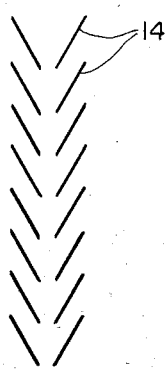
FIG. 2a is a schematic illustration of the plurality of stacked pairs of detector elements.
Figure 3:
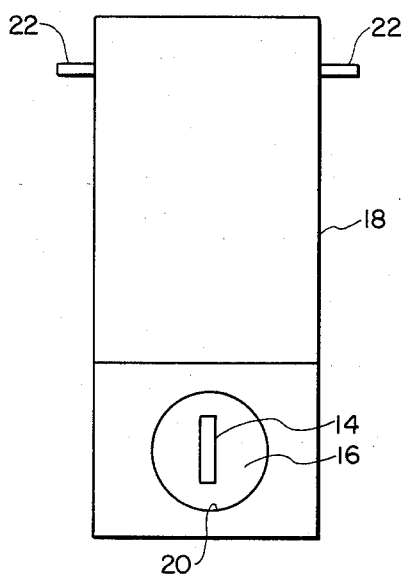
FIG. 3 is a front view of a tubular envelope containing the detector elements.

As shown in FIG. 2a, the detectors consist of an array of sixteen thin film single crystal infrared sensitive indium antimonide elements 14 deposited on a common base. The elements are mounted adjacent an infrared sapphire window 16 of a Dewar glass envelope 18 shown in FIG. 3. The lens elements 12 are secured to the outer flange 20 around the window face. The envelope is filled with liquid nitrogen to cryogenically cool the detectors. A sapphire infrared filter provides an inner base for the detectors. Various coatings on the lens, window and filter elements reduce stray radiation and background noise to ensure detector operation in the desired infrared spectral band. The detector elements are also made very narrow to further limit spurious response. The detector operates in a photovoltaic mode with proper voltages connected through leads 22 to the individual detector elements.

Figure 2B:
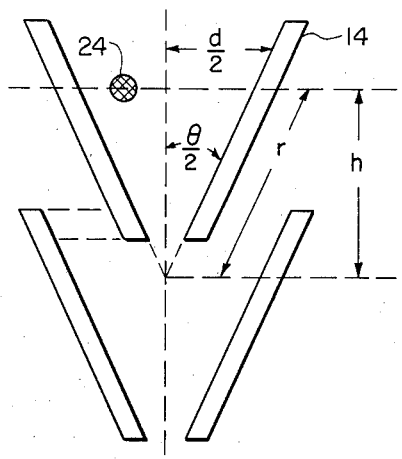
FIG. 2b shows an enlarged portion of two pairs of detector elements indicating angular and spatial relationships with respect to a scanned target image.

The detector includes eight pairs of V-shaped elements 14 stacked vertically in a common plane so that each pair covers 5° in elevation. As shown in FIG. 2b, there is a small overlap between the ends of adjacent vertical elements to ensure coverage if an optical target spot scans across the upper or lower limits of the elements. Each element of each pair is separate and spaced symmetrically about a centerline at 30° from the vertical. When an optical spot 24, representing a detected target image, such as a source of an infrared flash, crosses a detector element, a first pulse is generated followed by a time interval until the occurrence of a second pulse upon crossing the second element of the associated pair. The azimuth angle of the event is determined from the mean time of the two pulses and the elevation angle from the interval between pulses plus the indication of the particular pair of elements that detected the event.

Figure 2C:
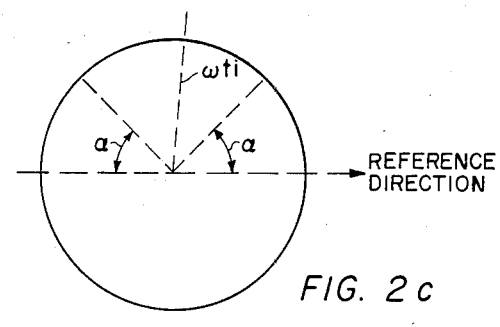
FIG. 2c is a schematic illustration of optical scanning parameters in the azimuth plane.
Figure 2D:
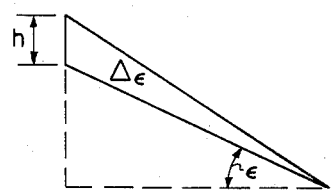
FIG. 2d illustrates the relationships of scanning parameters in the elevation plane.

The geometrical relationships illustrated in FIGS. 2b, 2c and 2d are used to determine the various parameters of the system.

Target azimuth angle is given by: $\alpha + \omega t_i$ from the reference direction, wherein $\alpha$ and $\omega$ are constants and time $t_1$ is the measured quantity. The angle $\alpha$ defines the limits of the optical scan region in the azimuth plane. Thus, the instrument scans an angle of $180° - 2\alpha$.

The following assumptions are made for purposes of simplification:

(a) target image is small or approximately equal to the detector width, (b) angular scan speed is fast compared to target angle speed, (c) over a small azimuth traverse, the target moves essentially horizontally, and (d) target velocity in the scan field is essentially constant.

The following equations apply:

$$r = \frac{vt_k}{2 \sin \Theta/2}$$

$$d = 2r \sin \Theta/2$$

$$h = r \cos \Theta/2$$

wherein v is the constant target velocity and $t_k$ is the time for the target image to cover distance d. The constant target image velocity is determined by the scan speed. h is used to determine the elevation angle $\epsilon$.

In order to detect and locate a desired target image within a given sector, it is necessary to examine the video signal produced by repeatedly scanning both elements of the V-detector over the scene and report only when both elements have observed a given sequence of signals on a series of frames. The system and circuitry for detecting a target image on one detector element or channel of a pair of V elements is independent of the activity on the other element, with two channels forming an elevation sector. The function of each channel is to identify a given sequence of signals, with two such signal sequences or events occurring in the same elevation sector, nearly the same azimuth, and nearly simultaneously, constituting the target image to be identified and located. Information on the precise time of occurrence of the events permits calculation of the azimuth and elevation coordinates within the particular sector.

As each single detector scans a sector, a signal is generated which may represent a target image. This signal is amplified in a preamplifier 26, shown in FIG. 1, and passed through a threshold circuit 28 which converts the video signal to a digital signal. A digital filler 30 provides a frame event signal to be processed by a digital signal processor 44. Sixteen like circuits are provided for respective detector channels which are multiplexed at the outputs of the digital filters for application to the common signal processor.

Figure 4:
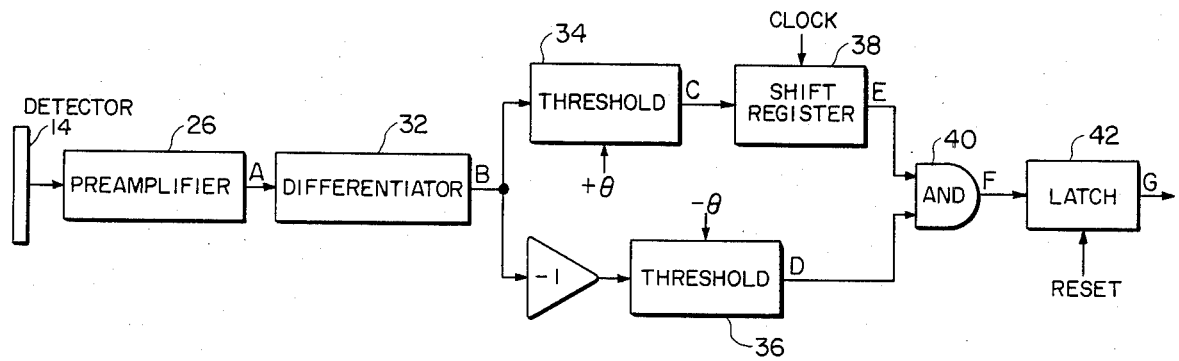
FIG. 4 is a block diagram of the threshold circuit for detecting a target.
Figure 5:
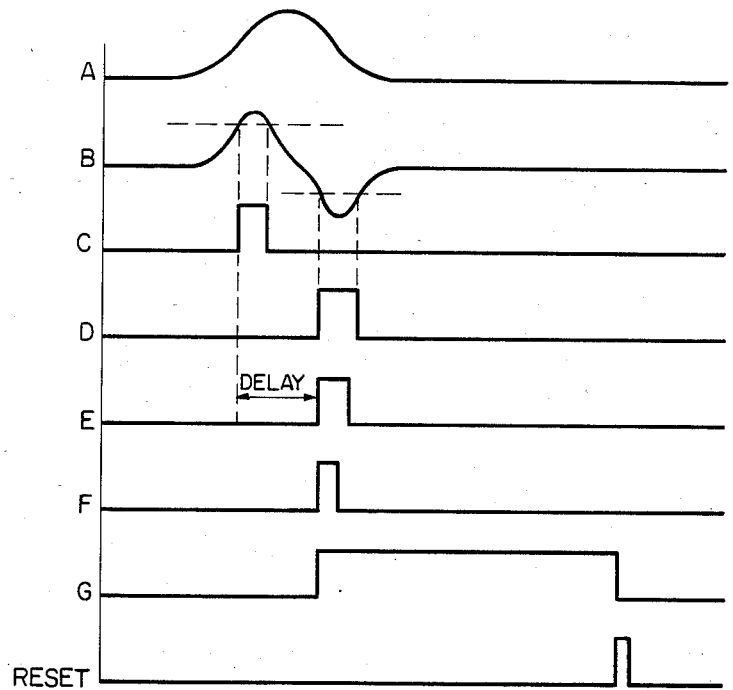
FIG. 5 is a timing diagram showing signals occurring during the operation of the threshold circuit.

FIG. 4 is a block diagram of the frame event detection system and FIG. 5 is a timing diagram showing the signals at various points in the circuit. Output of the preamplifier is illustrated as waveform A, which has a rounded pulse shape. The pulse from the amplifier is then passed through a differentiator 32 which provides a waveform having equal positive and negative excursions. The differentiated signal is shown as waveform B which is applied to two threshold circuits 34, 36, one operating on signal B and the other on −B. The outputs of the thresholds are shown as signals C and D respectively. The threshold levels $\pm \theta$ are shown as dashed lines on waveform B. Signal C takes on the value 1 when signal A has a sufficiently steep positive slope. An above threshold value at point C is defined as a positive event, while D represents a negative event. A shift register 38 and clock pulse delay the signal C, resulting in the signal pulse at E. Signal F becomes 1 only when both E and D are 1 at the input of AND circuit 40. In order to produce a pulse at F, a positive event must occur first followed by a negative event trailing by the set delay. The system thus responds only to pulses of the form illustrated as A and will not respond to pulses of longer duration, even if they contain steeper gradients. Signal F sets a latch circuit 42, such as a flip-flop, which remains set until reset, with output shown at G and a reset pulse shown at the trailing edge of G. The shift register, AND circuit and latch form the digital filters of FIG. 1.

This arrangement permits the latch to be consulted at less frequent intervals than would be required to detect F in the 1 state and reduces the subsequent processing rate. The latch is consulted at intervals responding to a scan resolution of ½ degree in azimuth. After the latch is consulted, it is reset so that it may register another pulse in the interval before the next interrogation and reset operation. A frame event is defined as having occurred only when the latch is in the set state. The time of the frame event is assumed to be midway between the present time and the last interrogation. The outputs of the latch circuits and frame event threshold detection circuits for each pair of associated detector elements are supplied to the common signal processor 44 which determines which frame events are part of a continuing sequence that should be tracked. When a frame event sequence occurs sufficiently close in time to a previous one, the coordinates are updated to coincide with the location of the most recent observation.

Upon recognition of a particular continuing target image, the frame number and azimuth position are reported to a logic circuit in the signal processor which attempts to find a pair of such signals, one from each of the two detector channels constituting a single sector. If the two signals have occurred either on the same or consecutive frames and have an azimuth relationship which could derive from the same image source, i.e., on the leading detector first and within a short distance thereafter on the trailing detector, then the target is recognized. The azimuth coordinates within the inclined V elements are then utilized to calculate the actual azimuth and elevation coordinates of the target within the sector. Information on the sector identified is then utilized along with information describing the rotating scanner orientation relative to inertial space to compute the position of the observed target in inertial coordinates. The time and location of other concurrent images are compared in the event that the target has been identified by another overlapping sector in order to avoid treating these as separate targets. Information from the signal processor may then be utilized for continued tracking of the infrared signal source and may be applied to a suitable display device or used for other purposes.

While only a single embodiment has been illustrated and described it is apparent that many variations may be made in the particular design and system configuration without departing from the scope of the invention as set forth in the appended claims.

What is claimed is:

1. A radiation scanning and detection system comprising:
- a plurality of optical radiation detectors positioned to detect radiation in azimuth and elevation from a remote source, each detector being adapted to provide a signal representative of said radiation, said detectors including a plurality of pairs of infrared sensitive elements aligned and spaced vertically in a common plane, respective said pairs having a V-shape including symmetrical elements spaced from each other about a vertical axis;
- optical scanning means for scanning a field of view and directing radiation from said remote source transversely across said plurality of pairs of vertically aligned detectors, each said pair being adapted to cover a small angle of elevation in the field of view in accordance with the vertical position in said plane;
- threshold means associated with each separate detector element for sensing each said signal at respective vertical positions and providing a digital pulse when each said signal exceeds a predetermined amplitude;
- digital filter means for establishing a predetermined sequence of digital pulses representative of said signal and supplying an output pulse upon the occurrence of said sequence; and
- signal processing means for processing a plurality of output pulses from a plurality of said digital filter means to locate the position of said remote source in said field of view.

2. The system of claim 1 wherein said optical scanning means is a rotatable four sided mirror, each side scanning a portion of the azimuth of said field of view.

3. The system of claim 2 including amplifier means for amplifying said signal, differentiator means providing positive and negative excursions for said signal, said threshold means including a pair of threshold circuits respectively receiving said positive and negative signal excursions and providing positive digital pulses at spaced intervals, said digital filter means for establishing a pulse sequence including means for delaying the first positive digital pulse by a predetermined time to coincide with the second positive pulse and means providing an output pulse upon the coincident occurrence of said first and second pulses, said plurality of digital filter means providing a plurality of output pulses when said detected radiation is successively scanned across two elements of a respective pair.

4. The system of claim 3 including a tubular envelope, said pairs of detector elements being in the form of thin elongated films disposed on the face of said envelope, a lens focusing said radiation on said face, said envelope having a plurality of connecting leads for supplying direct voltage to said detector elements.

5. The system of claim 4 wherein the ends of adjacent spaced pairs of detector elements overlap in a vertical dimension.

6. The system of claim 4 wherein said envelope is filled with liquid nitrogen to cryogenically cool said detector elements.

7. The system of claim 4 wherein said elements are formed of indium antimonide.

8. The system of claim 3 wherein said digital filter means for establishing a pulse sequence includes a shift register, an And circuit and a latch circuit.

* * * * *